Dec. 17, 1929.  A. F. HAWKINS  1,740,014
VEHICLE PROPELLER FOR ENDLESS CONVEYERS
Filed Sept. 21, 1928  2 Sheets-Sheet 2
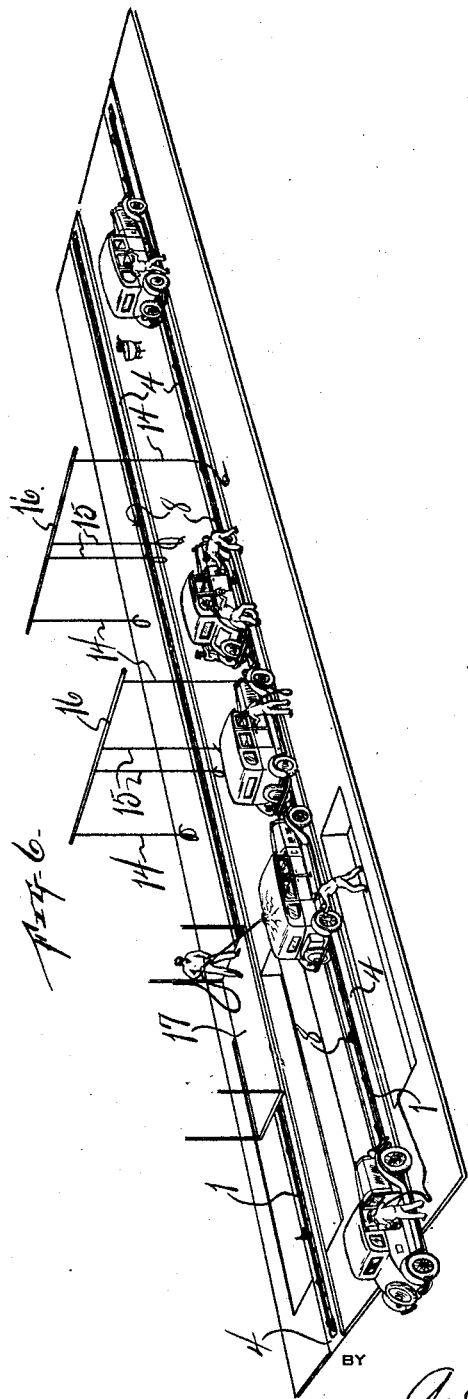
INVENTOR
ALDA F. HAWKINS.
BY *A. D. Jackson*
ATTORNEY Patented Dec. 17, 1929

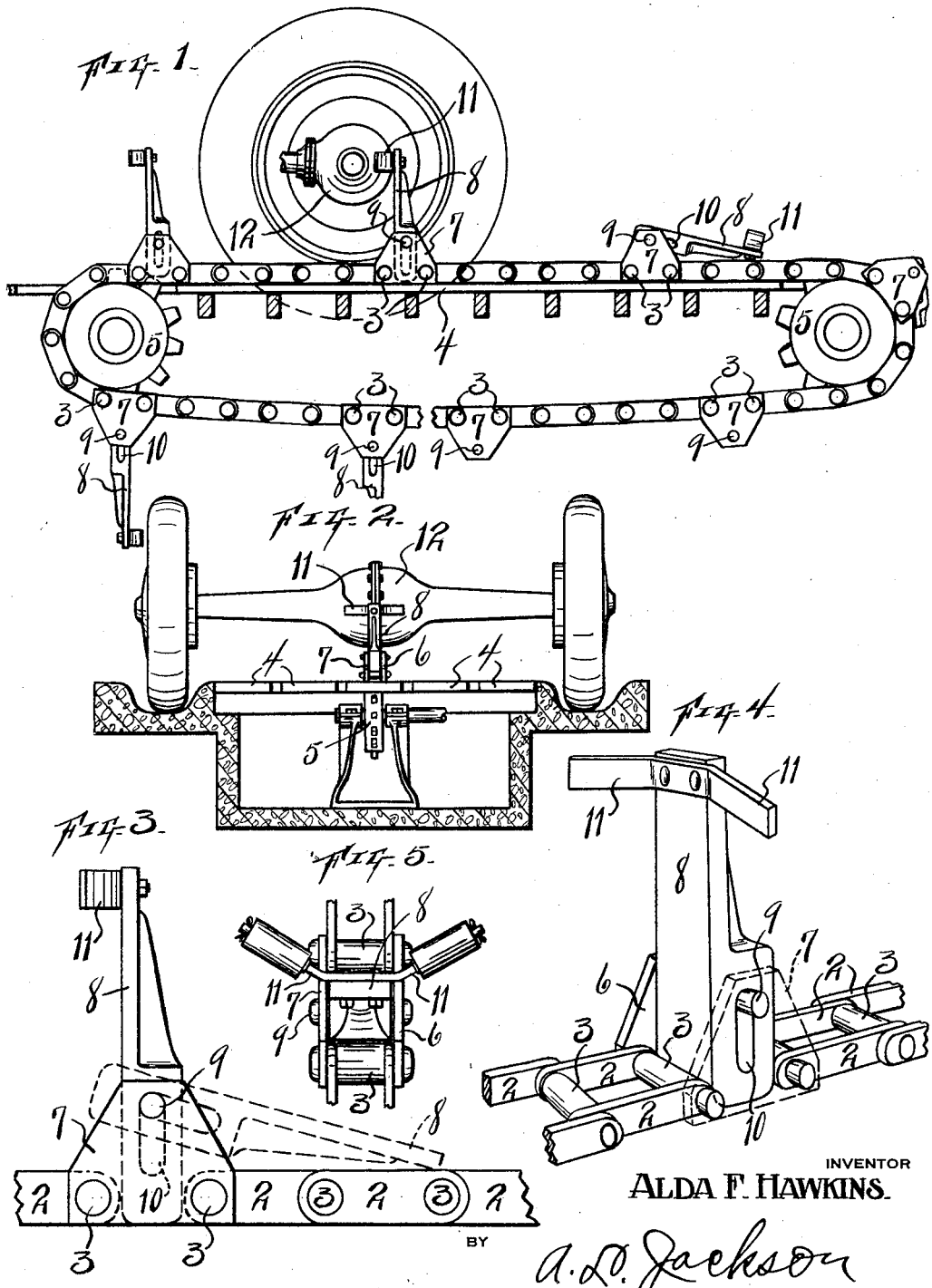

1,740,014

UNITED STATES PATENT OFFICE

ALDA F. HAWKINS, OF FORT WORTH, TEXAS

VEHICLE PROPELLER FOR ENDLESS CONVEYERS

Application filed September 21, 1928. Serial No. 307,522.

My invention relates to conveyers and more particularly to propellers carried by endless conveyers; and the object is to provide simple devices for engaging a motor vehicle axle or differential gear housing for moving the vehicle or other object. The applicant is using these devices on endless conveyers for moving vehicles along while being washed or cleaned and dried. The devices may be manually positioned to engage a vehicle. The devices are automatically released when the vehicle has been moved to the required location. The advantages of such propeller are that they are strong and durable and positive in action and a great convenience in washing or cleaning and drying automobiles. Other objects and advantages will be fully explained in the following description and the invention will be more particularly pointed out in the claims.

Reference is had to the accompanying drawings which form a part of this application.

Fig. 1 is a side elevation of an endless conveyer equipped with the propellers and illustrating the action of the propellers.

Fig. 2 is a rear elevation of a car axle and wheels, showing a propeller engaging the differential gear housing.

Fig. 3 is an enlarged side elevation of a propeller and a portion of a conveyer.

Fig. 4 is an enlarged perspective view of a propeller attached to a conveyer, one of the propeller brackets omitted.

Fig. 5 is a plan view on a reduced scale, showing a portion of a conveyer and a propeller attached thereto.

Fig. 6 is a perspective view of a portion of a car washing and cleaning plant, illustrating two conveyers and apparatus in action of cleaning automobiles.

Similar characters of reference are used to indicate the same parts throughout the several views.

The drawings show conveyer chains 1 made up of side bars 2 and connecting pins 3.

The chain conveyers run along on platforms 4 and on sprocket wheels 5 making an endless conveyer. A plurality of automobiles may be propelled and washed at the same time. The plant illustrated turns out an automobile thoroughly washed and dried every ten minutes. A plurality of propelling devices are attached to the chains for moving the vehicles. There must be a propelling device for each vehicle.

Each propeller includes a pair of brackets 6 and 7. These brackets are attached to two pins 3 of the chain 1 and the brackets 6 and 7 take the place of two side bars 2. The brackets 6 and 7 engage the pins 3 in the same manner as the side bars 2. A standard 8 is loosely connected to the brackets 6 and 7 by a pivot stud 9 which is rigid with the brackets 6 and 7 and projects through slot 10 in the standard 8. It is necessary that the standards 8 lie down on the chain 1 when the standard is not in use, because the standard might interfere with other cars or be broken off. The propellers are held in position for service by the pin 3 just in front of the standard and held in position by the pin or pivot stud 9 in connection with the brackets 6 and 7, or it may be said that the brackets 6 and 7 hold the standard 8 in operative position by means of the pivot stud 9 on one side and the pin 3 holds the standard on the other side. The standard carries arms 11 which in the illustration given engage the differential gear housing 12 in operation. It is apparent that the arms 11 must vary with each different type of gear housing and it is apparent that the standard 8 may be provided with different forms of engaging means so that the standard may engage a car axle or gear housing of different types.

In operation, the standard 8 is knocked down automatically by reason of the slots 10 in the standards. When the standard 8 starts over the sprocket wheel 5 at the end of the travel of the standard, a tooth of the sprocket wheel will push the standard 8 upwardly out of engagement with the pin 3. The standard 8 will then be thrown backwardly to the dotted outline position shown in Fig. 3. The standard 8 is thus made to release the car or vehicle after the vehicle has been cleaned. When the conveyer starts back to starting position the propellers hang downwardly and are manually turned to operative position.

The cleaning equipment includes hangers 14 for water and air hose which are supported on bars 15 which are carried by upright supports 16. The equipment also includes platforms 17 for the workmen.

Fig. 5 shows the arms 11 provided with rollers. The object of these rollers is to prevent possible hanging of the arms on bolts or other objects and to make the propeller pass under gasoline tanks and spare tires.

What I claim is,—

1. A propeller attached to a carrier chain for moving motor vehicles comprising a standard provided with means for engaging an axle of the vehicle, and means for adjustably connecting said standard to an endless conveyer for giving the standard swinging and sliding motion relative to the conveyer.

2. A propeller attached to an endless conveyer for moving vehicles comprising a standard provided with means for engaging an axle of a vehicle, brackets fixedly attached to said conveyer, and means for adjustably connecting said standard to said brackets whereby said standard is slidably connected to said brackets for operative and inoperative purposes.

3. A propeller attached to an endless conveyer for moving vehicles comprising a standard provided with means for engaging an axle of a vehicle, brackets operatively connected to said conveyer and said standard for holding said standard in substantially rigid upright position for moving vehicles and for carrying said standard in knock-down positions and means for connecting said standard to said brackets for permitting swinging and sliding motion of the standard relative to the brackets.

4. A propeller attached to an endless conveyer for moving vehicles comprising a standard provided with a vertical slot and means for engaging an axle of a vehicle, brackets operatively connected to said conveyer for holding said standard in substantially rigid upright position and a pivot stud rigid with said brackets and projecting through said slot.

5. A propeller in combination with an endless conveyer for moving vehicles comprising a standard provided with a vertical slot and means for engaging an axle of a vehicle, brackets attached to said conveyer and loosely connected with said standard and utilizing one of the pins of said conveyer to hold said standard in operative position and a pivot stud rigid with said brackets and adapting said brackets for carrying said standard in the knockdown position.

6. A propeller in combination with an endless conveyer for moving vehicles comprising a standard adapted to engage a vehicle axle and provided with a slot therein, brackets attached to said conveyer and utilizing a pin of said conveyer to hold said standard in rigid working position, and a pivot stud rigid with said brackets and adapted to move in said slot for permitting said standard to shift from inoperative position to operative position and vice versa.

In testimony whereof, I set my hand, this 17th day of September, 1928.

ALDA F. HAWKINS.